United States Patent [19]

Biedermann et al.

[11] Patent Number: 5,267,807
[45] Date of Patent: Dec. 7, 1993

[54] DRIVEABLE CONNECTION BETWEEN DRUM COMPONENTS FOR AUTOMATIC TRANSMISSION FRICTION DISC CLUTCH

[75] Inventors: Sieghart Biedermann, Pulheim; Friedel Lauscher, Kommweg; Vladimir Premiski, Bad Muenstereifel-Willerscheidt, all of Fed. Rep. of Germany

[73] Assignee: Ford Motor Company, Dearborn, Mich.

[21] Appl. No.: 743,651

[22] Filed: Aug. 12, 1991

[30] Foreign Application Priority Data

Nov. 9, 1990 [DE] Fed. Rep. of Germany ....... 4035686

[51] Int. Cl.$^5$ ............................................. F16B 21/06
[52] U.S. Cl. ..................................... 403/375; 403/326; 403/335; 403/364; 192/85 AA
[58] Field of Search .............. 403/108, 328, 109, 377, 403/316, 300, 335, 340, 364, 370, 326, 289, 348, 11, 13, 14; 192/85 AA; 285/921, 913

[56] References Cited

U.S. PATENT DOCUMENTS

| | | | |
|---|---|---|---|
| 2,710,763 | 6/1955 | Gilbert | 403/364 |
| 2,738,210 | 3/1956 | Hjembo | 403/335 |
| 3,599,512 | 8/1971 | Wayman | 192/85 AA X |
| 3,672,162 | 6/1972 | Rygelis et al. | 285/921 X |
| 4,440,282 | 4/1984 | Ishimaru et al. | 192/85 AA X |
| 4,578,608 | 3/1986 | Mech et al. | 403/364 X |
| 4,646,897 | 3/1987 | Winters | 403/326 X |
| 4,813,808 | 3/1989 | Gehrke | 403/377 X |
| 4,944,376 | 7/1990 | Ozaki et al. | 192/85 AA |

FOREIGN PATENT DOCUMENTS 1630950 8/1975 Fed. Rep. of Germany .
2013612 12/1977 Fed. Rep. of Germany .

Primary Examiner—Randolph A. Reese
Assistant Examiner—Harry C. Kim
Attorney, Agent, or Firm—Frank G. McKenzie; Roger L. May

[57] ABSTRACT

The connection for releasably joining two drum components of a hydraulically-actuated double friction disc clutch includes first and second drum components having circular cylindrical surface directed substantially axially, one overlapping the other. The inner component is formed with a catch groove or two catch recesses and the outer drum component includes catch projections, offset mutually 180° and adapted to become locked within the catch groove. The outer drum includes tabs at an axial end adapted to fit within recesses formed on the periphery of the inner drum between catch projections. The drums are driveably connected by applying oppositely directed axial force sufficient to snap the catch projections into the catch groove. The drums are disassembled by elastically deforming the outer drum until the catch projections clear the catch groove and then applying an axial force that separates the drums.

9 Claims, 3 Drawing Sheets

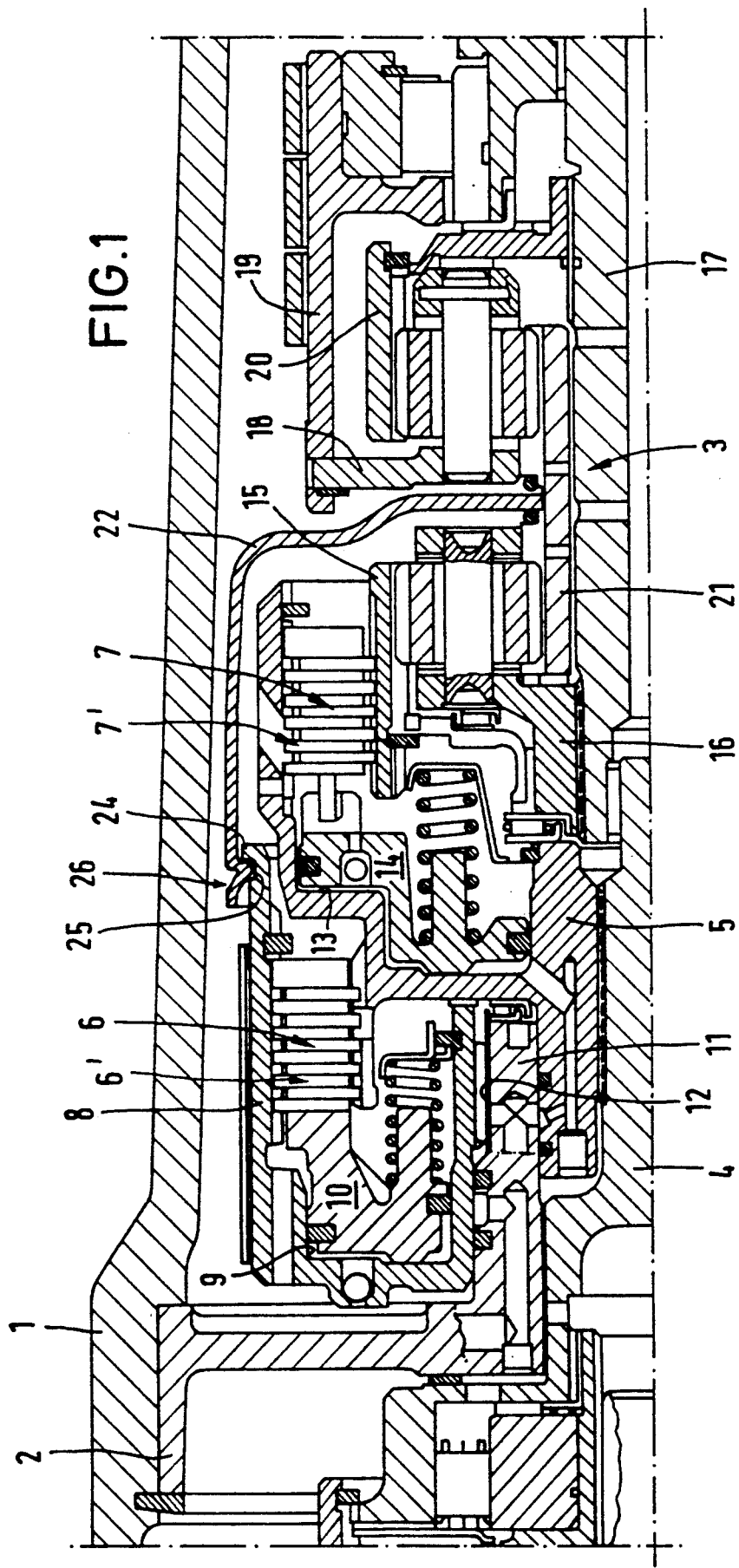

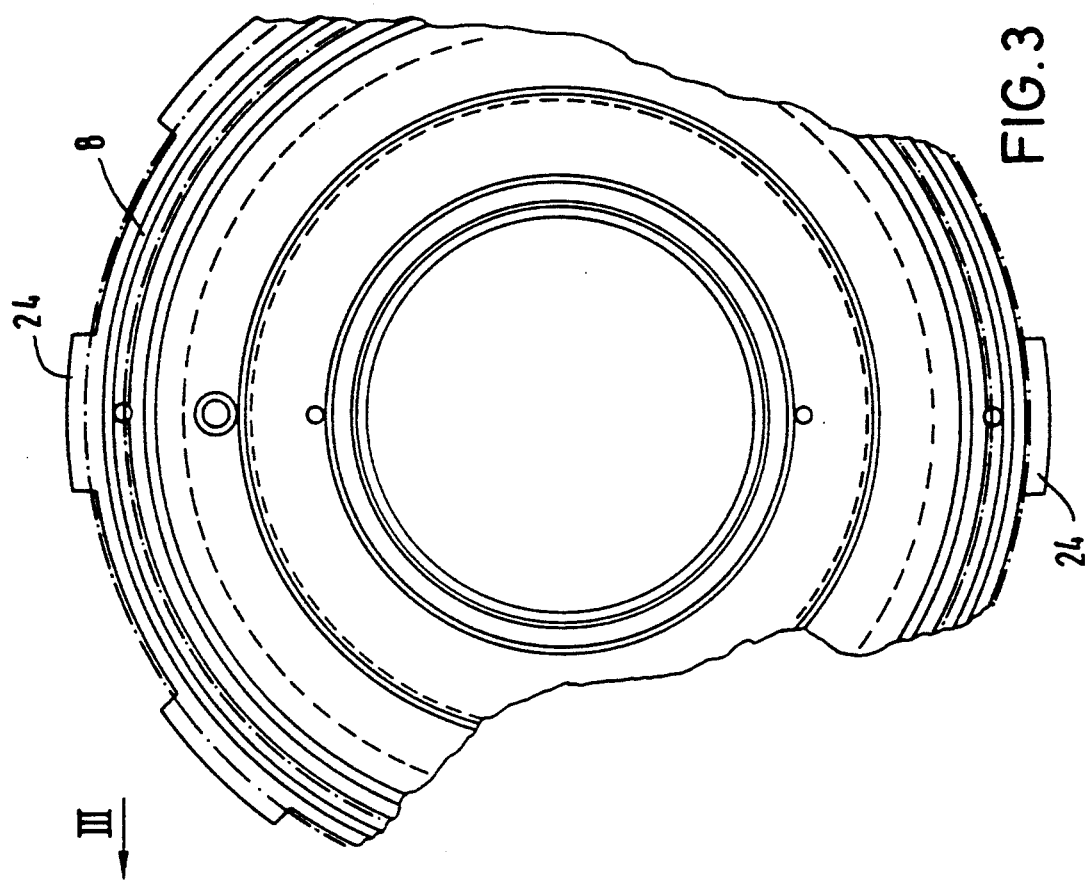
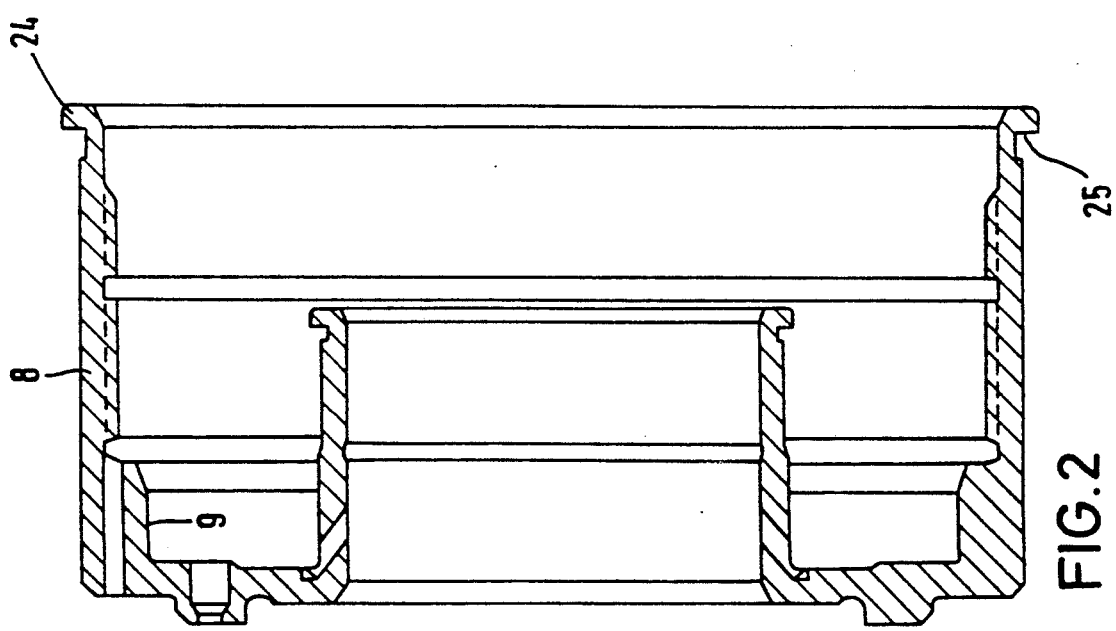

5,267,807

DRIVEABLE CONNECTION BETWEEN DRUM COMPONENTS FOR AUTOMATIC TRANSMISSION FRICTION DISC CLUTCH

BACKGROUND OF THE INVENTION

1. Field of the Invention

This invention relates to a catch connection joining two drum components for a hydraulically actuated friction disc clutch of an automatic transmission for motor vehicles. In particular the invention pertains to the connection itself and to a technique for establishing and disestablishing it.

2. Description of the Prior Art

German Patentschrift 16 30 950 describes a technique for joining two drum components of a double clutch used to control gear ratio changes in a planetary gear system. The two drums are joined by a bayonet-type catch connection to form an assembled unit.

The bayonet-type catch connection makes it necessary to insert the two drum components axially into one another and thereafter to rotate one of them circumferentially with respect to the other. Furthermore, to prevent undesired release of the bayonet-type catch connection while the drum components rotate during operation, a push-over locking mechanism is provided to prevent relative rotation between the drum components.

The catch connection of the '950 document is therefore difficult to manipulate during assembly and requires additional cost to manufacture the locking mechanism.

A planetary gear transmission for motor vehicles is described in Patentschrift 20 13 612. The transmission includes two drum components of a hydraulically actuated double friction disc clutch connected mutually by interlocking the drum components to form an assembled unit. The interlocking is achieved by a snap ring groove provided on one component and a snap ring inserted within the groove and partially surrounding the other drum component. In this clutch, a carrier that supports one set of friction discs is supported by a thrust bearing on a cylindrical extension of a central carrier of the transmission. One drum component is rotatably mounted on the carrier by a radial needle bearing, from which the cylinder/piston unit is supplied with pressure from a source of hydraulic pressure.

Assembly and disassembly of the snap ring connecting the two drum components must be accomplished manually.

SUMMARY OF THE INVENTION

An object of this invention is to provide a catch connection for two drum components of a hydraulically actuated double friction disc clutch for an automatic transmission. The connection is simple and inexpensive to produce and is suitable for automated assembly such that it can be released readily for repair or replacement when necessary.

This object is achieved in that an encircling catch groove or two catch recesses are formed on one drum component, and two radially directed catch projections, offset mutually by 180°, are formed on the other drum component. The two drums are driveably connected by axially pressing one drum component against the catch projection, expanding it radially to clear the lip of the recess and allowing engagement of the projection within the recess.

Because one pot-shaped drum component is connected in a catching manner and merely being pressed axially onto the other drum component by radial enlargement of the other drum component in the elastic region, reliable axial and radial interlocking is achieved simply and at low fabrication and assembly cost.

The radial protruding catch projections, which are offset mutually by 180°, are provided with different catch and release ramps adapted to the catch groove or catch recesses.

DESCRIPTION OF THE DRAWINGS

The invention is described in more detail with reference to an embodiment illustrated in the accompanying drawings.

FIG. 1 is a partial vertical cross section through an automatic transmission for a motor vehicle, this section being taken in a region of a hydraulically-actuated double friction disc clutch.

FIG. 2 is a cross section taken at a diametrical plane through one drum component of the double friction disc clutch of FIG. 1.

FIG. 3 is an end view of one drum component taken in the direction of the arrow III in FIG. 2.

DESCRIPTION OF THE PREFERRED EMBODIMENT

Figure 5:
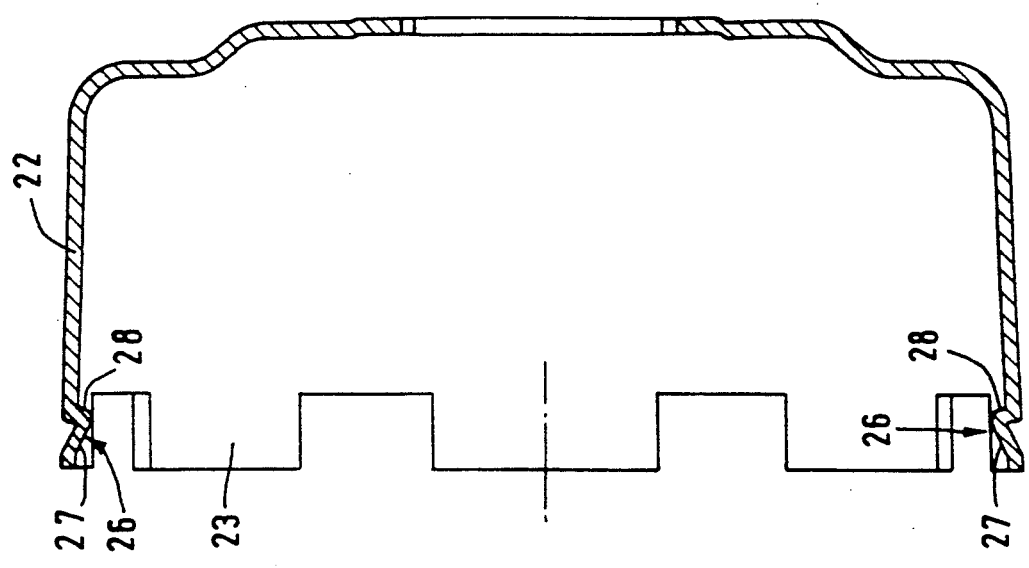
FIG. 5 is a cross section through the second drum component, the section being taken along plane V—V in FIG. 4.
Figure 4:
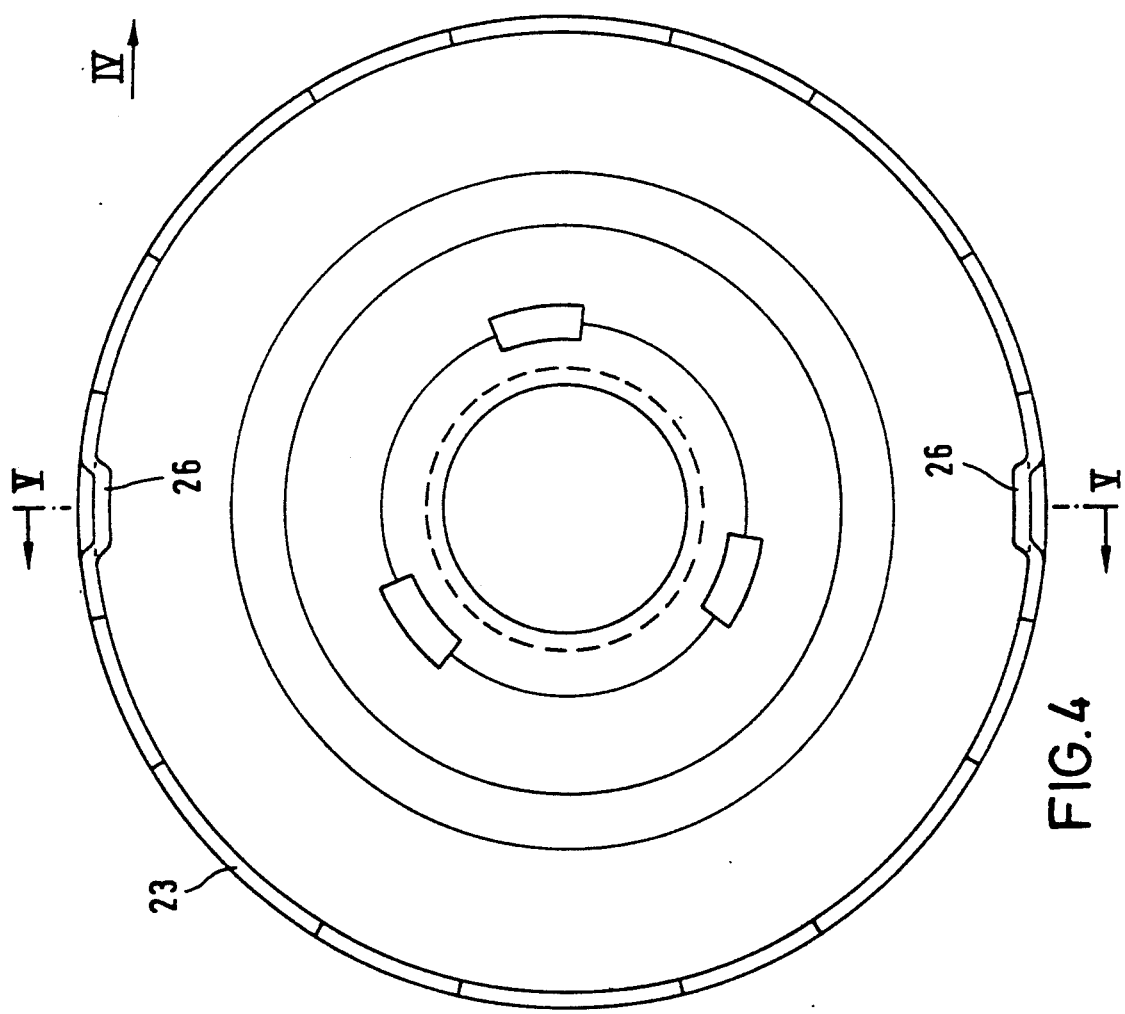
FIG. 4 is an end view of a second drum component in the direction of the arrow IV in FIG. 5.

The gearset of a planetary transmission having a Simpson-type gearset 3 is located in a rear chamber of a transmission casing separated from a forward chamber by a central carrier 2. Driving torque is introduced into the planetary gear transmission by an overdrive planetary gearset through a central shaft 4.

Shaft 4 is driveably connected by a spline to a clutch carrier component 5, which supports a first set of friction discs 6 fixed to the carrier on its external periphery and a second set of friction discs 7 fixed to the carrier on an internal periphery.

Between each disc of the first set of friction discs 6 there is located another set of friction discs 6', whose members are driveably fixed on their external peripheries to an internal surface of a first pot-shaped drum component 8. Drum component 8 forms a circular cylinder 9, in which there is located an annular piston 10 by which friction discs 6 and 6' are hydraulically actuated and mutually engaged. Drum component 8 is rotatably mounted on a cylindrical extension 11 of central carrier 2 by a needle bearing, which runs on an internal race and centers the adjacent needle bearing 12.

Also located in clutch carrier component 5 is an annular cylinder 13, which contains an annular piston 14 by which two sets of friction discs 7 and 7' are hydraulically actuated and mutually engaged. Located between each member of the second set of friction discs 7 there is located an additional set of friction discs 7', whose members are driveably connected at their internal peripheries to ring gear 15 of a first planetary gearset of the Simpson-type set 3.

Planet carrier 16 of the first planetary gearset is driveably connected to the output shaft 17 of the transmission. Planet carrier 18 of the second planetary gearset of the Simpson-type set 3, is connected to brake drum 19. Ring gear 20 of the second planetary gearset of the Simpson-type set 3 is connected to output shaft 17.

Sun wheel 21, which is common to both planetary gearsets, is connected driveably to the first pot-shaped drum component 8 and to pot-shaped drum component 22.

In the prior art, the connection between component 8 and component 22 consisted merely of axially, manually overlapping tabs 23 and protrusions 24 located between tabs 23. This arrangement produced a driving connection between drum components 8 and 22 but did not prevent the drum components from sliding axially apart. Formerly one drum component 8 had to be supported on central carrier 2 by means of an axial run-on disc.

The connection of this invention includes a catch connection produced between the two drum components 8 and 22. The catch connection consists of an encircling catch groove 25 formed on the first drum component or two catch recesses each aligned angularly with radially inwardly protruding catch projections 26, mutually offset by 180°, on drum component 22.

The radially inward protruding catch projections 26 have a catch ramp 27 and a release ramp 28, seen best in FIG. 5. The connection process for interlocking the two drum components 8, 22 includes axially pressing the catch ramp 27 against the lip 24 near catch groove 25 until the drum components are displaced elastically in the vicinity of catch projections 26. Expansion of drum component 22 is such that its circular cylindrical shape is distorted elastically to an oval whose major diameter passes through the angularly spaced projections 26 and whose minor diameter is substantially perpendicular to the major diameter.

To disassemble the drum components, radially directed clamping forces are applied inwardly to the outer surface of the circular cylindrical drum 22 thereby causing elastic distortion inwardly at the point of the application of the clamping force and radially outwardly in the major diameter connecting catch projections 26. When the magnitude of the applied clamping force is sufficiently great, catch projections 26 move radially outward relative to the lip 24 of the drum 8 near the axially outermost end of catch grooves 25. When this condition is established and while it is maintained, an additional force is applied to drum component 22 directed axially away component 8. The axial force presses release ramps 28 against lip 24 and causes additional outward displacement of catch projections 26. This combination of radial and axial forces permits drum 22 to be removed from drum component 8.

Torque is transmitted between the drum components 8, 22 by fitting tabs 23 into the angularly spaced recesses located between lips 24 on the outer rim of drum component 8. Tabs 23 and the recesses between lips 24 must have sufficient clearance in the radial direction so that the slight oval enlargement of drum component 22 required for the assembly and disassembly processes is accommodated.

Having described a preferred embodiment of our invention, what we claim and desire to secure by U.S. Letters Patent is:

1. An assembly for driveably connecting rotatably mounted components, comprising:

a first drum having a longitudinal axis, a catch groove surrounding said axis, and a stop surface adjacent the groove; and a second drum having first and second latch means formed integrally with the second drum, mutually spaced diametrically opposite about said axis, adapted for resilient radial distortion so that the latch means clear the stop surface, engagement of the catch groove upon removal of said distortion to prevent displacement along said axis relative to the first drum, and disengagement of the catch groove to permit displacement along said axis, restrained by contact with the stop surface against displacement relative to the catch groove, and means for limiting rotation of the second drum about said axis relative to the first drum.

2. The assembly of claim 1 wherein the catch groove and stop surface are located near an axial end of said first drum adjacent the second drum, and the first and second latch means are located near an axial end of the second drum adjacent the catch groove and stop surface.

3. The assembly of claim 1 wherein;

the first drum further comprises recesses located at the axial end thereof adjacent the second drum, each recess being mutually angularly spaced about the longitudinal axis, each said recess being bounded at angularly opposite sides by first surfaces extending along the axis; and the second drum further comprises tabs located at the axial end thereof adjacent the first drum, each tab mutually angularly spaced about the axis, each said tab having at angularly opposite sides thereof second surfaces extending along the axis and adapted to fit within one of said recess, the first surfaces and second surfaces adapted to mutually contact, whereby the first drum and second drum are mutually driveably connected about said axis by said contact.

4. The assembly of claim 1 wherein:

the first drum further comprises a radially directed first flange and a first cylindrical surface extending toward the second drum and away from the first flange, the catch groove and stop surface being formed on the first cylindrical surface; and the second drum further comprises a radially directed second flange and a second cylindrical surface extending toward the first drum and away from the second flange, said latch means being formed on the second cylindrical surface.

5. The assembly of claim 4 wherein the latch means includes:

a catch ramp surface inclined radially outward as distance along the length of the second drum from the second flange increases, located for contact with the stop surface as the latch means moves toward the stop surface;

a release ramp inclined radially inward as distance along the length of the second drum from the second flange increases, located for contact with the stop surface a the latch means moves away from the stop surface.

6. The assembly of claim 2 wherein;

the first drum further comprises recesses located at the axial end thereof adjacent the second drum, each recess being mutually angularly spaced about the axis, each said recess being bounded at angularly opposite sides by direct surfaces extending along the axis; and the second drum further comprises tabs located at the axial end thereof adjacent the first drum, each tab mutually angularly spaced about the axis, each said tab having at angularly opposite sides thereof second surfaces extending along the axis and adapted to fit within one of said recesses a recess, the first surfaces and second surfaces adapted to mutually contact, whereby the first drum and second drum are mutually driveably connected by said contact.

7. The assembly of claim 4 wherein;

the first drum further comprises recesses located at the axial end of the first cylindrical surface adjacent the second drum, each recess being mutually angularly spaced about the axis, each said recess being bounded at angularly opposite sides by first surfaces extending along the axis; and the second drum further comprises tabs located at the axial end of the second cylindrical surface adjacent the first drum, each tab mutually angularly spaced about the axis, each said tab having at angularly opposite sides thereof second surfaces extending along the axis and adapted to fit within one of said recesses, the first surfaces and second surfaces adapted to mutually contact, whereby the first drum and second drum are mutually driveably connected by said contact.

8. A method for driveably connecting rotatably mounted components of an automatic transmission including a first drum having a longitudinal axis, a catch groove surrounding said axis and a stop surface adjacent the groove, and a second drum having first and second latches mutually spaced angularly about said axis adapted to engaging the catch groove to prevent relative displacement of the drums along said axis, comprising the steps of:

locating the first drum and second drum in position in a casing with the catch groove adjacent the latches;

moving the first drum or second drum relative to the other drum along the axis;

applying radially inwardly directed forces to the second drum at angularly spaced locations offset angularly from the location of the latches;

concurrently forcing the first drum or second drum axially relative to the other drum; and resiliently seating the latches in the catch groove.

9. A method for disconnecting rotatably mounted, driveably connected components of an automatic transmission including a first drum having a longitudinal axis, a catch groove surrounding said axis and a stop surface adjacent the groove, and a second drum having first and second latches mutually spaced angularly about said axis engaged in the catch groove preventing relative displacement of the drums along said axis, comprising the steps of:

applying radially inwardly directed forces to the second drum at angular locations substantially diametrically opposite the location of the latches; and concurrently forcing the latches into contact with the stop surfaces sufficiently so that the latches clear the stop surfaces; and moving the first drum or second drum axially apart from the other drum.

* * * * *